United States Patent [19]

Sleger

[11] 4,097,005
[45] Jun. 27, 1978

[54] WEB TRANSPORT SYSTEM

[75] Inventor: Roger R. Sleger, Redwood City, Calif.

[73] Assignee: Ampex Corporation, Redwood City, Calif.

[21] Appl. No.: 682,373

[22] Filed: May 3, 1976

[51] Int. Cl.² .................. G11B 15/43; G11B 15/28; B65H 77/00; B65H 75/22

[52] U.S. Cl. .................... 242/189; 226/49; 226/195; 242/75.3; 242/209

[58] Field of Search ............ 242/189, 190, 209, 206, 242/75.3, 75.5, 75.51, 150, 45; 226/195, 188, 49, 50, 51, 44; 318/6, 7

[56] References Cited

U.S. PATENT DOCUMENTS

| | | | |
|---|---|---|---|
| 3,155,339 | 11/1964 | Groenewegen | 242/75.51 |
| 3,231,216 | 1/1966 | Lemarchand | 242/150 |
| 3,318,547 | 5/1967 | Bejach | 242/190 |

Primary Examiner—George F. Mautz
Attorney, Agent, or Firm—Robert G. Clay; Charles M. Carman, Jr.

[57] ABSTRACT

A highly compact and functional professional audio magnetic tape transport provides a simple, symmetrical tape path including a pair of reels positioned in side-by-side relationship, a pair of large, equal diameter rollers positioned in side-by-side relationship below the reels, a pair of buffer loop tape tension arms positioned between the rollers and reels to receive tape directly from the reels along a straight tape line and without any intervening guide, and a transducer assembly positioned in frictional engagement with the tape along the tape path between the rollers. A capstan drive system is coupled to energize one of the rollers as a capstan to control tape motion along the tape path while reel servo systems energize the reels to maintain the tension arms at nominal central positions of rotation. Variations in tape tension with reel pack diameter are minimized and made self-equalizing by orienting the nominal arm positions perpendicular to tape direction for intermediate reel pack diameters. By utilizing torque transducers to actively control tension arm torque in response to system operating conditions tape tension adjacent the capstan can be balanced on opposite sides thereof and tape-capstan slippage can be avoided without need for an easily damaged, hard to maintain resilient rubber coating on the capstan or an awkward, large wrap angle of tape about the capstan.

30 Claims, 4 Drawing Figures

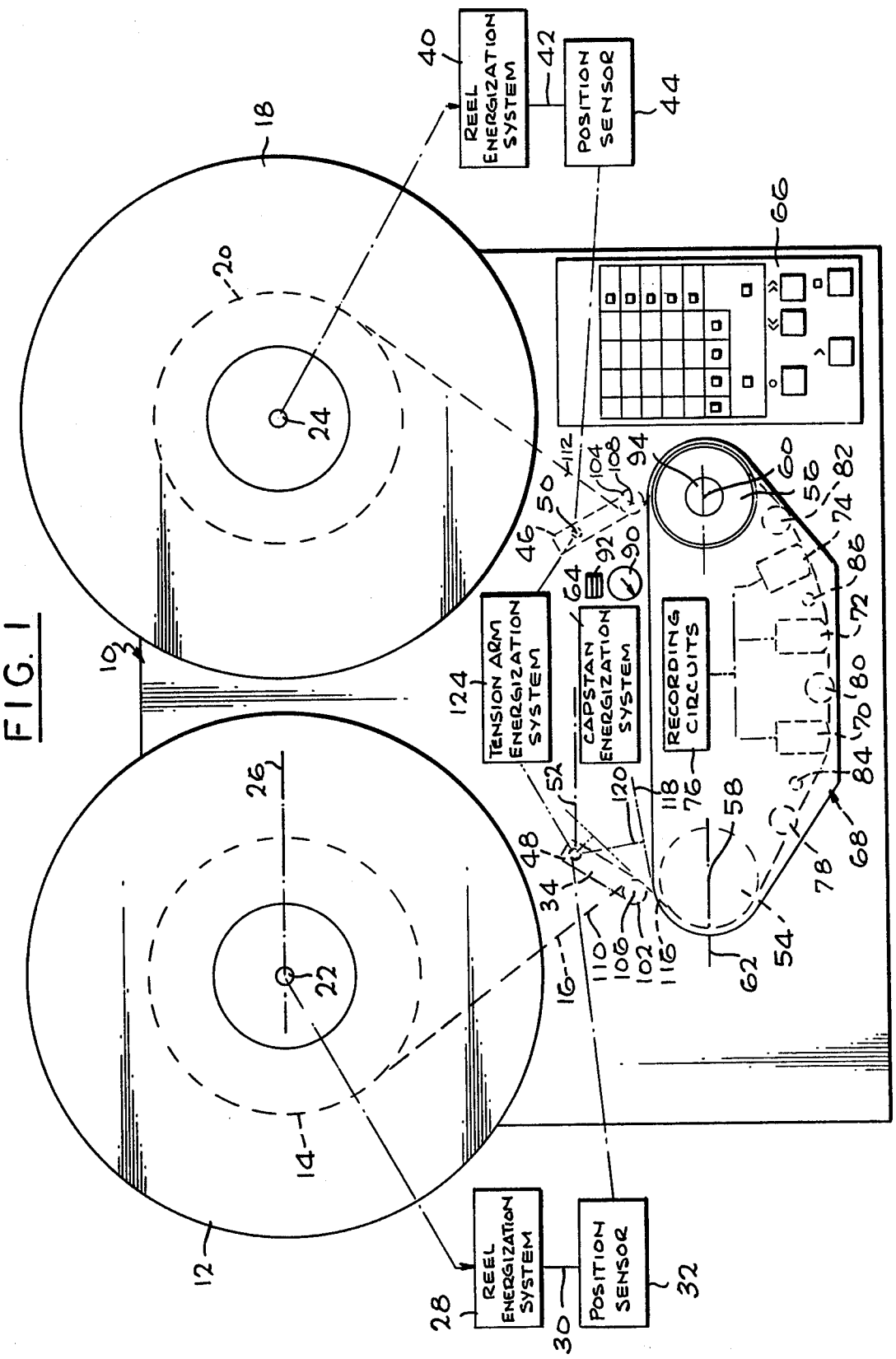

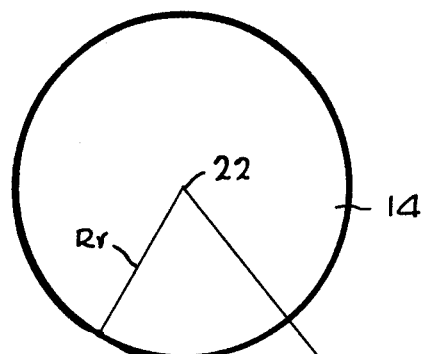
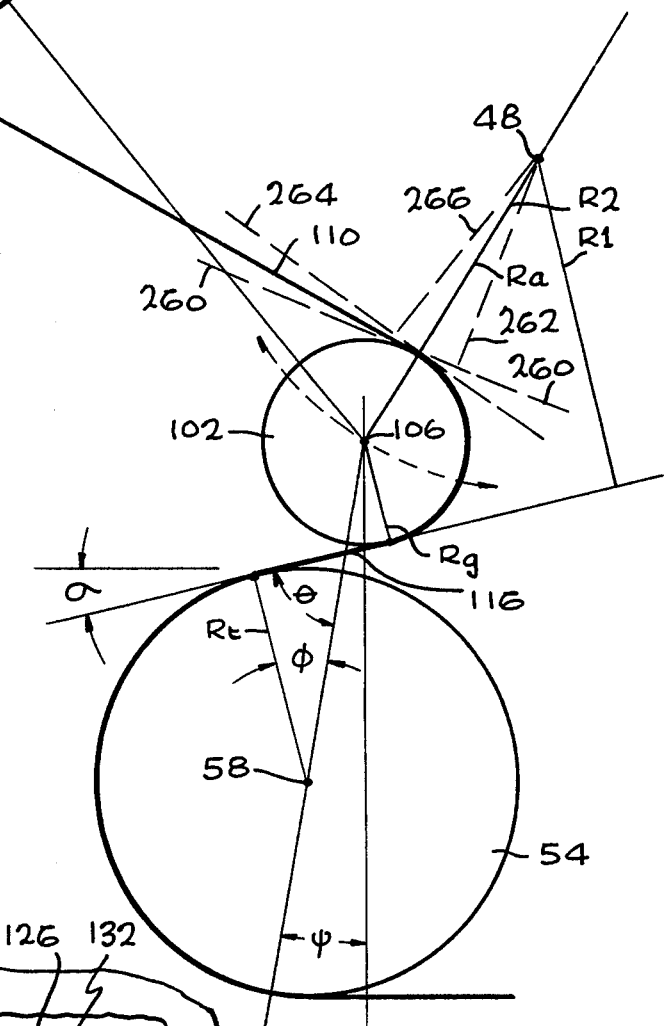
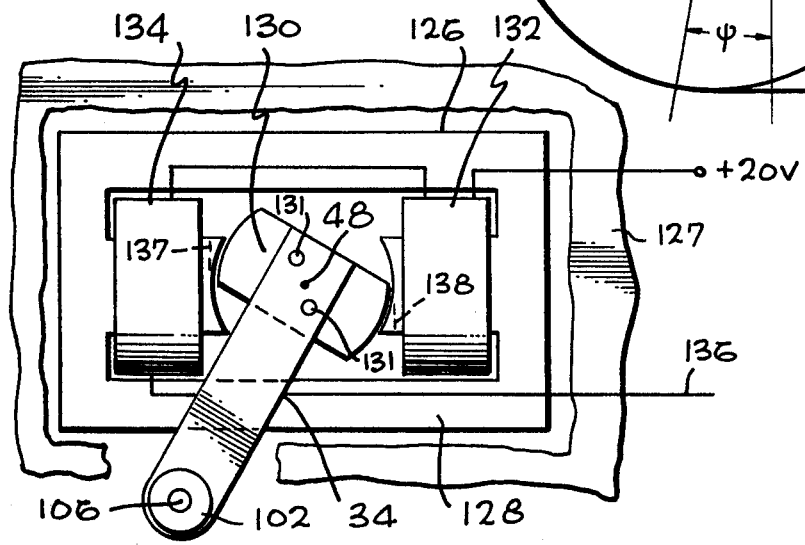
FIG 4
FIG 2

WEB TRANSPORT SYSTEM

CROSS REFERENCE TO RELATED APPLICATIONS

This patent application is related to the following commonly assigned, copendinng patent applications:

1. Web Transport Capstan Control System, Ser. No. 682,849, filed May 3, 1976, by Robert Perrine Harshberger, Jr.
2. Switching Motor Control System, Ser. No. 682,372, filed May 3, 1976, by Robert Perrine Harshberger, Jr.

BACKGROUND OF THE INVENTION

1. Field of the Invention

This invention relates to web transport systems having a capstan controlling web motion along a web path and more particularly to a professional audio magnetic tape transport system.

2. Description of the Prior Art

Web transport systems are required for a large variety of applications which range from heavy industrial applications to motion picture projectors and magnetic tape transports. Such systems are typically utilized where comparatively rapid, precise control over web motion is required. These systems typically employ one or more capstans engaging the web material to control its motion along a web path and a web storage system disposed to supply and take up web material moving along the web path. Vacuum chambers or tension arms may be employed to provide buffer loops adjacent the web storage system to permit web acceleration along the web path to exceed the capabilities of the web storage system for a short time.

The exact requirements of a web transport system depend on particular applications and even requirements of magnetic tape transports vary widely according to their intended usage. For example, digital tape transports must provide closely controlled acceleration intervals with moderate speed control during steady state operation. For audio and instrumentation tape transports acceleration is less important but a very precise constant speed must be maintained.

In particular, audio tape transports have typically provided small diameter capstans of ½ inch diameter or less with a large inertia rotating motor assembly and a pinch roller to maintain the tape in frictional, nonslip engagement with the capstan. The small capstan must rotate rapidly to drive tape at a nominal speed and the high rotational energy of the capstan rotor assembly resulting from the high speed and high inertia helps to maintain rotating speed more constant. These audio transports thus accelerate tape very slowly and frequently provide two loop tension buffers adjacent the reels. One typical audio system has no buffering between the capstan and a take-up reel and only a tension sensor positioned between the head assembly and a supply reel to permit the supply reel to be energized to maintain constant tape tension across the head assembly during steady speed operation.

Although audio tape transports have heretofore provided high energy, slow acceleration capstan control systems, these systems have had severe disadvantages. For example, several seconds and several inches of tape may be required to accelerate to a nominal play speed. An operator wishing to begin playing a given recording location at a given instant in time must preposition the given recording location on the tape several inches upstream from the read head and then turn the transport on several seconds before the desired play start time. A misjudgment of either tape distance or acceleration time would result in a failure to begin playing at the desired location at the desired time.

SUMMARY OF THE INVENTION

A high performance, but compact and economical web transport system in accordance with the invention includes a web storage system disposed to supply and take up web material moving bidirectionally along a web path, a single drive capstan positioned in a nonslip engagement with web material to bidirectionally control web motion along the web path, a capstan drive system coupled to energize the capstan in accordance with transport operating conditions, a pair of web loop tension arms positioned along the web path on opposite sides of the capstan to maintain buffer loops of web material as well as web tension in accordance with torque applied to the tension arms, a pair of torque transducers coupled to apply torque to the tension arms in response to tension command signals, and a torque control system coupled to generate tension command signals which vary in accordance with web transport system operating conditions.

More particularly, in a professional audio transport system the web is a magnetic tape and the storage system includes a pair of tape reels having tape wound thereon in a helical coil and a reel energization system controlling reel motion to tend to maintain the tension arms at nominal positions between long and short loop limit positions. The nominal positions are selected to orient each tension arm perpendicular to the line of tape when an intermediate diameter tape pack is stored by an adjacent reel. Under this arrangement the torque moment arm of the segment of tape going to the reel is a maximum and decreases with deviations of tape pack from the intermediate diameter. However, if the distance between the points of tangency of the tape with the tape pack and tension arm is greater than the variations in tape pack radius, the tension variations tend to be quite small and the requirement for constant tension guides between the tension arms and reels to assure a constant wrap angle of tape about the tension arms can be avoided. Furthermore, variations in tape tension at the two tension arms tend to be equal to help maintain equal tension across the capstan. The orientation of the tension arms relative to symmetrical idler and capstan rollers in such that torque applied to the tension arm by a tape segment between the arm and roller increases as a tension arm rotates inwardly to increase buffer loop length. The torque transducers are constructed to apply increased torque as loop length increases. These torque changes tend to cancel each other to maintain constant tension in the tape.

Additional advantages result from controlling tension arm torque in accordance with tape direction to compensate for head friction and further maintain balanced tension across the capstan. With tension thus balanced a large, hard surface capstan of ceramic material such as aluminum oxide may be employed without need for a pinch roller or large tape wrap angle. The problems associated with maintenance and susceptibility to damage of a rubberized capstan are thus avoided. The large capstan diameter reduces the required acceleration energy to permit acceleration to nominal speed in 0.5 second or less as well as capstan control over high shuttle speeds. In one mode of operation the tension arm adjacent the capstan may be given a high torque energization to cause the arm to engage the capstan as a pinch roller. Capstan control of tape motion may thus be maintained even in a play edit operating mode wherein the take-up reel is deenergized and tape accumulates between the capstan and the take-up reel.

BRIEF DESCRIPTION OF THE DRAWINGS

A better understanding of the invention may be had from a consideration of the following detailed description taken in conjuction with the accompanying drawings in which:

FIG. 1 is a combination plan view and block diagram representation of a professional audio magnetic tape transport in accordance with the invention;

FIG. 2 is a plan view, partly broken away, of a portion of the transport shown in FIG. 1 having a tension arm and torque transducer;

FIG. 4 is a diagram illustrating the relationship between tape tension and tension arm torque for one of the tape loop tension arms.

DETAILED DESCRIPTION

Figure 3:
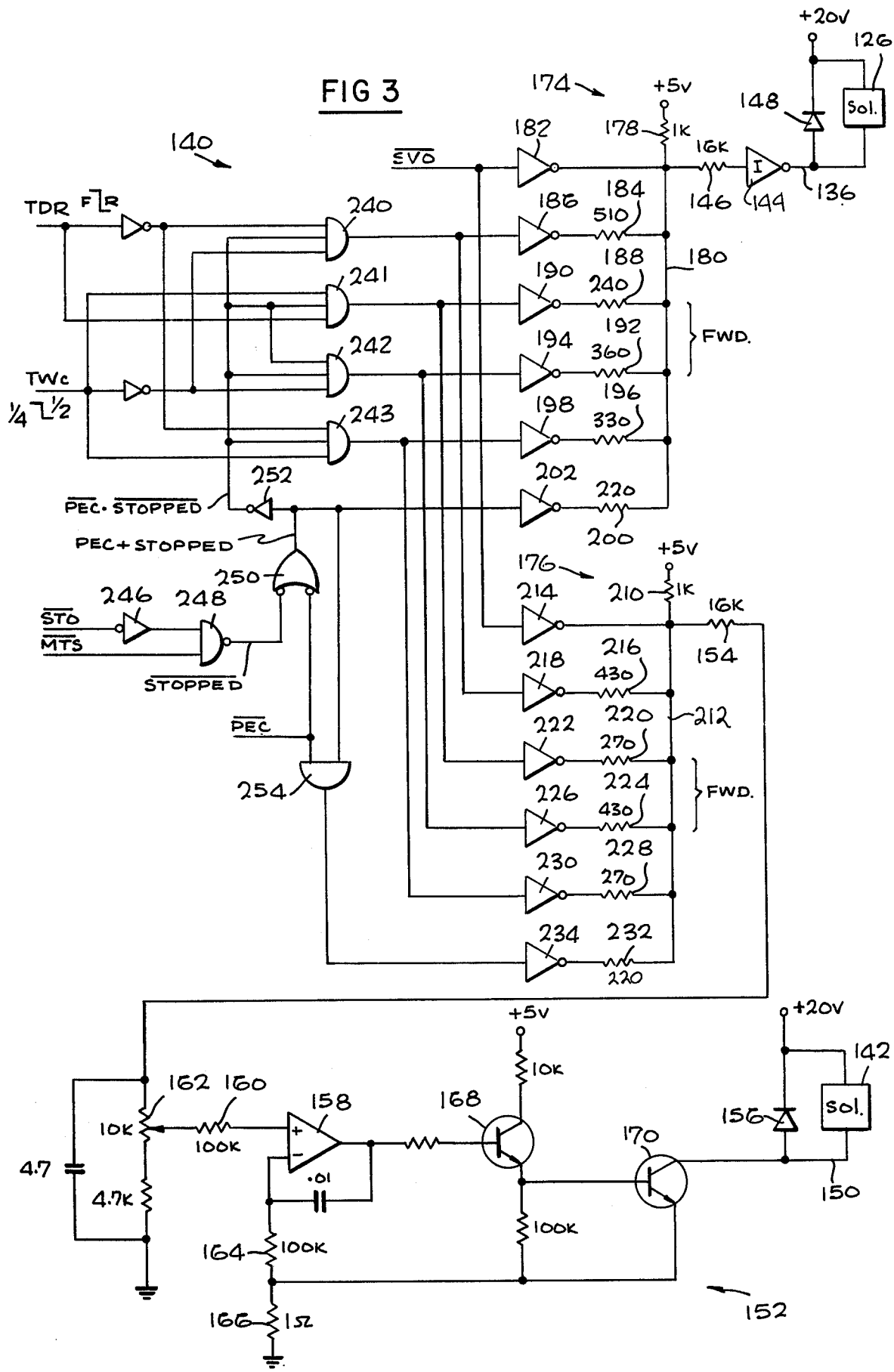
FIG. 3 is a schematic diagram of an energization control circuit for controlling the energization of the torque transducer shown in FIG. 2.

As shown in FIG. 1, a professional audio magnetic tape transport 10 in accordance with the invention includes a supply reel 12 storing a first helical coil 14 of magnetic tape 16 and a take-up reel 18 sotring a second helical coil 20 of magnetic tape 16. The reels 12, 18 are mounted in side-by-side relationship for rotation about reel axes 22, 24 respectively which lie along a horizontally extending reel ine 26. A supply reel energization system 28 is coupled to rotationally energize the supply reel 12 in response to a tension arm position signal 30 received from a position sensor 32. Position sensor 32 is coupled to sense the rotational position of a supply side tape loop tension arm 34 and generate the tension arm position signal 30 as an indication thereof. The reel energization system 28 responds to the position signal 30 to bidirectionally energize the reel 12 and tape coil 14 to maintain tension arm 34 at a nominal central position intermediate long and short loop limit positions. Similarly, a reel energization system 40 receives a tension arm position signal 42 from a position sensor 44 which indicates the rotational position of a take-up side tape loop tension arm 46 and bidirectionally energizes the take-up reel 18 and tape coil 20 to tend to maintain the tension arm 46 at a central nominal position during steady speed motion of tape 16 along a web path extending between the supply tension arm 34 and take-up tension arm 46.

The tension arms 34, 46 are mounted for rotation about tension arm axes 48, 50 respectively which are positioned equidistant from the reel axes 22, 24 respectively along a tension arm line 52 which extends parallel to the reel line 26. This spacing between the axes 48 and 50 is less than the spacing between the axes 22 and 24.

An idler roller 54 and a capstan roller 56 are positioned for rotation about roller axes 58 and 60 respectively. The roller axes 58 and 60 are positioned equidistant from the reel axes 22 and 24 respectively along a roller line 62 that extends parallel to the reel line 26 and arm line 52 with the arm line 52 positioned between the roller line 62 and reel line 26. The distance between the roller axes 58 and 60 is greater than the distance between the arm axes 48 and 50 but less than the distance between the reel axes 22 and 24. The rollers 54 and 56 have cylindrical tape engaging surfaces with substantially equal diameters to provide symmetry for the tape path defined by the tape 16. The rollers 54 and 56 have relatively large diameters in excess of 1.5 inches (3.31 cm) and preferably of approximately 2.375 inches (6.03 cm). This relatively large diameter permits the capstan 56 to control motion of the tape 16 along the tape path in all modes of operation including high speed forward and rewind shuttle modes as well as normal record/reproduce speeds. Capstan motion is controlled by a capstan energization system 64 in response to operator control signals communicated through a control panel 66. The capstan energization system 64 may include a direct coupled D.C. capstan motor and tachometer providing a capstan rotor assembly having moderate inertia for good control over steady state speed operation. However, the large diameter of capstan 56 permits the capstan motor of capstan energization system 64 to provide nominal tape speeds at moderate motor speeds so that excessive energy is not required for acceleration of capstan 56. A combination of precise steady state speed control and rapid acceleration times less than 0.5 seconds may thus be attained with the present arrangement. A transducer head assembly 68 including an erase head 70, a write head 72, and a read head 74 is positioned along the path of tape 16 between the rollers 54 and 56 for frictional engagement with the same side of the tape 16 as the rollers 54 and 56. Recording circuits 76 control the recording of information on or reproducing of information from the magnetic tape 16 as it moves past the head assembly 68. Edge guide surfaces 78, 80 and 82 positioned along the path of tape 16 between the rollers 54 and 56 guide and position the tape 16 as it passes the head assembly 68. A pair of solenoid actuated lifter arms 84, 86 are positioned to selectively lift the tape 16 from the head assembly 68 during high speed shuttle operations to reduce head wear on the head assembly 68.

A rotary switch 90 permits operator selection of nominal play/record tape speeds while a toggle switch 92 turns the transport 10 on and off. Capstan 56 has a cylindrical capstan handle 94 which extends out of the plane of the tape path for easy manipulation by an operator. The handle 94 thus makes it possible for the capstan roller 56 to control motion of tape 16 along the tape path even in response to direct operator control. An operator may thus preposition the tape 16 by hand by merely rotating the capstan 56 and without touching the reels 12, 18 which are automatically energized to supply and take up tape 16 as necessary.

Guide rollers 102, 104 are mounted on the tape loop tension arms 34 and 46 for rotation about guide axes 106, 108 which are spaced apart from the arm axes 48 and 50 respectively. The tape 16 passes directly from the associated respective tape coils 14 and 20 along straight line tape paths 110, 112 to the guide rollers 102 and 104 respectively without intermediate guiding. From guide roller 102 the tape 16 passes directly to idler roller 54 where it has an approximately 143° wrap around angle and passes the head assembly 68 to the capstan roller 56. The tape 16 has an approximately 134° wrap around angle about capstan 56 to complete the symmetry of the tape path before passing directly to gude roller 104 and then directly along straight line tape path 112 to tangentially engage the outer circumference of helical tape coil 20.

The torque exerted on a tape loop tension arm 34 or 46 by the tape 16 is equal to the tape tension times the distance between a first straight line tape segment of tape on one side and the axis of rotation plus the tape tension times the distance between a second straight line segment of tape on the other side and the axis of rotation. For example, a first portion of the torque exerted on tension arm 34 about axis 48 is equal to the tape tension times the distance between the straight line tape path 116 and axis 48. It may be observed that this distance is fairly small for the nominal position of arm 34 wherein the straight line 116 passes reasonably close to axis 48. However, as arm 48 moves inwardly toward a longer loop position, this moment arm length, which is measured perpendicular to the line 116, becomes longer as indicated by alternate tape line 118 and alternate moment arm 120.

As long as the tension arm 34 remains in its nominal position in fixed relationship to roller 54, the torque exerted on arm 34 about axis 48 by the tape segment passing along tape path 116 remains constant and does not induce changes in tape tension.

On the other hand, the angle of tape path segment 110 changes with tape pack diameter and therefore does induce changes in tape tension. In prior art systems these tension changes can be as much as three to one and thus a constant tension tape guide is placed along the tape path segment 110 to prevent changes in tape tension with a diameter of coil 14. These large changes in tape tension could easily cause slippage of tape 16 on capstan 56. However, as explained more fully below, so long as the distance between the tangent points of tape path segment 110 with guide 102 and coil 14 is greater than the changes in coil radius and the distance between line segment 110 and axis 48 is at a maximum when the tension arm 34 is in its nominal position and the coil 14 has an intermediate diameter half way between its typical largest and smallest diameters, the variations in tape tension are small and the extra guide can be eliminated to simplify the tape path and reduce cost.

In addition to the tape tension uniformity provided by proper positioning of tension arms 34 and 46, tape tension adjacent capstan 56 on opposite sides thereof may be further balanced by selectively controlling the torque applied to tension arms 34 and 46 by a tension arm energization system 124. The tension arm energization system 124 includes electromagnetic torque transducers applying torque to the tension arms 34 and 46 about axes 48 and 50 respectively in response to tension control signals. The tension may thus be controlled in response to tape direction or other tape transport operating conditions to neutralize variations in tape tension at the capstan 56 which result from frictional forces of head assembly 68 and depend on tape direction. Thus, by providing constant tape tension regardless of tape coil diameter and tape direction, across capstan 56, there with be no tape slippage relative to capstan 56 even though the tape wrap angle is relatively small and the capstan 56 does not have a high friction resilient rubber coating thereon. For example, the capstan 56 may have a hard nonresilient tape engaging surface of a ceramic material such as aluminum oxide. The problems of damage and special cleaning requirements for rubberized capstan surfaces are thus avoided and a convenient tape path configuration that does not require a large wrap around angle of tape 16 about capstan 56 may be employed.

Referring now to FIG. 2, an electromagnetic torque transducer 126 in the form of a variable reluctance rotary solenoid is illustrated behind a partly broken away cover plate 127 as including a magnetic armature 128 and rotor 130 coupled by rivets or screws 131 to apply torque to the supply side tape loop tension arm 34 about tension arm axis 48. Armature 128 provides a continuous laminated magnetic path to opposite sides of rotor 130 and is magnetically energized by coils 132, 134 which are in turn energized by a tension control signal 136 in the form of a controlled current. Alternate laminations terminate along straight lines 137 and 138 which are tangential to the curvature of armature 128 adjacent the rotor 130. Thus, as arm 34 and rotor 130 rotate clockwise toward a shorter loop position the effective air gap between armature 128 and rotor 130 increases and the torque applied to arm 34 by transducer 126 decreases for a given applied tension control current signal. Accordingly, a counterclockwise rotation tends to produce an increased applied torque which compensates the increase of effective moment arm of straight tape line segment 116 about axis 48 for counterclockwise rotation of arm 34. Constant tape tension at arm 34 is thus maintained for different rotational positions of arm 34 to further insure balanced tape tension across opposite sides of capstan roller 56 to guard against tape slippage. The torque transducer 126 thus replaces the spring mechanism that is typically associated with a tape tension arm to provide a torque that may be conveniently controlled and varied in accordance with tape operating conditions of the tape transport 10. Electromagnetic relationships of torque transducer 126 are described generally in Rotors, Herbert C., *Electromagnetic Devices*, First Ed., pp. 204–205, John Wiley & Sons, Inc. (New York, 1941).

Referring now to FIG. 3, there is shown the energization control circuit 140 for controlling the energization of the supply torque transducer solenoid 126 and the take-up torque transducer solenoid 142. Torque transducer solenoid 126 has one terminal coupled to +20 volts and a second terminal at which the tension control signal 136 is provided coupled to a drive amplifier 144 which energizes torque transducer solenoid 126 in response to a command voltage provided through a 16K coupling resistor 146. A diode 148 is coupled in parallel with torque transiducer solenoid 126.

Similarly, torque transducer solenoid 142 has one terminal coupled to +20 volts and a second terminal coupled to a tension control signal 150 provided in the form of a current signal by a drive amplifier 152 in response to a voltage provided through a 16K coupling resistor 154. A diode 156 is connected in parallel across torque transducer solenoid 142. Because the drive amplifiers 144 and 152 are identical, only the drive amplifier 152 is shown in detail. It includes an operational amplifier 158 with a high open loop voltage gain coupled in a noninverting configuration with the noninverting input coupled through a 100K resistor 160 and through an adjustable terminal of a 10K potentiometer 162 to coupling resistor 154. The potentiometer 162 permits fine adjustment of the torque produced by torque transducer solenoid 142. For a preferred method of adjustment, the tape transport is operated in a forward mode with intermediate tape pack diameters on both the supply and take-up reels. The potentiometer within drive amplifier 144 (not shown) which is equivalent to potentiometer 162 is adjusted to provide a desired tape tension across the head assembly 68 as indicated by a tape tension sensor, which is an item of test equipment and not a part of the tape transport 10. The potentiometer 162 is then adjusted to provide substantially no tape tension differential adjacent opposite sides of the capstan 56.

The inverting input of amplifier 158 is coupled through a 100K resistor 164 to a 1 ohm current sensing resistor 166. Amplifier 158 thus provides a positive output signal until the current through resistor 166 provides a voltage potential at the inverting input equal to the voltage potential at the non-inverting input. Amplifier 152 thus operates as a voltage to current converter to produce a current through solenoid 142 in the form of tension control signal 150 which is linearly proportional to an applied voltage signal. The output of amplifier 152 is coupled to the base of an npn transistor 168 whose emitter is in turn coupled to the base of an npn transistor 170. The collector current of transistor 170 provides the tension control signal 115 for torque transducer solenoid 142. Voltage divider networks 174 and 176 provide the controlled voltages for driver amplifier 144 and driver amplifier 152 respectively. The voltage divider network 174 includes a 1K resistor 178 coupled between +5 volts and a summing junction 180 providing the control voltage for the tension control signal 136. Junction 180 is directly coupled to a logic inverter gate 182, coupled through a 510 ohm resistor 184 to a logic inverter gate 186, coupled through a 240 ohm resistor 188 to a logic inverter gate 190, coupled through a 360 ohm resistor 192 to a logic inverter gate 194, coupled through a 330 ohm resistor 196 to a logic inverter gate 198 and coupled through a 220 ohm resistor 200 to a logic inverter gate 202. Similarly, the voltage divider 176 includes a 1K resistor 210 coupled between +5 volts and a summing junction 212. The summing junction 212 is directly coupled to a logic inverter 214, coupled through a 430 ohm resistor 216 to an inverter 218, coupled through a 270 ohm resistor 220 to an inverter 222, coupled through a 430 ohm resistor 224 to an inverter 226, coupled through a 270 ohm resistor 228 to an inverter 230 and coupled through a 220 ohm resistor 232 to an inverter 234.

The coupling resistors and logic inverter gates operate as a special digital to analog converter to provide voltages at the summing junctions 180 and 212 in response to applied digital signals.

An AND gate 240 has its output connected to inverter 186 and inverter 218, and AND gate 241 has its output connected to inverter 190 and inverter 222, and AND gate 242 has its output connected to an inverter 194 and an inverter 226 and an AND gate 243 has its output connected to the inputs of an inverter 198 and an inverter 230.

The complement of a servo on signal, $\overline{SVO}$, is coupled to the input of inverter gates 182 and 214.

In a standby mode when the servos are to be inoperative, the signal SVO goes low or false, making its complement go high and the output of inverter gates 182 and 214 to go low and pull the summing junctions 180 and 212 down to ground potential. This commands zero current flow through the torque transducer solenoids 126 and 142 to prevent the generation of any torque in the tension arms. Under normal operating conditions the servo on signal, SVO, is high making its complement low to disable inverter gates 182 and 214 to enable the other inverter gates to control the current command signals, in accordance with the operating status of tape transport 10.

The complement of a stop command signal, $\overline{STC}$ is communicated through an inverter gate 246 to one input of a NAND gate 248 while the complement of a motion sense signal, $\overline{MTS}$, is applied to the other input of NAND gate 248. The output, $\overline{STOPPED}$, of NAND gate 248 thus goes low to indicate a stopped condition when a tape stop condition has been commanded and tape motion has actually stopped. A NAND gate 250 receives the $\overline{STOPPED}$ signal as well as a complement play edit command signal, $\overline{PEC}$, to generate an output signal, PEC + STOPPED. This signal is inverted by an inverter gate 252 to disable the AND gates 240–243 in response to a play edit command or a commanded stop condition and to enable the AND gates 240–243 during a normal tape motion condition.

In the event of a stopped condition, the output of NAND gate 250 goes high and is connected to the input of inverter gate 200 and through an AND gate 254 to the input of an inverter 234. The inverter gates 202 and 234 are coupled through relatively small 220 ohm resistors to the respective summing junctions 180 and 212 to provide equal, but relatively small command voltages to the drive amplifiers 144 and 152 to command relatively small torques for the tape loop tension arms during a standby stopped condition. In the event of a play edit command, the same small torque is applied to the supply reel tension arm 34 but AND gate 254 blocks the signal to inverter gate 234 so that summing junction 212 receives a maximum 5 volt command signal and a maximum torque is applied to tape loop tension arm 46 causing it to be driven against capstan roller 54 to act as a pinch roller with the tape 16 pinched between the guide roller 104 and the capstan roller 156.

In the event of a normal tape motion condition, the output of NAND gate 250 goes low to enable the AND gates 240–243. One of these AND gates is fully activated in response to a tape direction signal, TDR, and a tape width command signal, TWC. If ¼ inch tape is being used signal TWC is high to enable AND gates 211 and 243 while if ½ inch tape is being used signal TWC is low to enable AND gates 240 and 242. Signal TDR enables gates 241 and 243 for a forward motion direction while AND gates 240 and 242 are enabled for a reverse motion direction.

If it is assumed for purposes of illustration that half inch tape is being utilized and tape motion is in a forward direction, then AND gate 242 will be fully enabled to provide a high output signal. AND gate 240 would be enabled for a reverse direction. It will be noted that for the take-up tension arm the summing junction 212 is coupled to ground through a 430 ohm resistor 216 or 224 for either direction of motion and applied torque, and hence taped tension, remains the same for both directions of motion of tape 16. The tension is maintained the same because the tape path friction does not modify the tape tension on the take-up side of the capstan in accordance with tape direction. However, the head assembly 68 does modify tape tension on the supply side of the capstan in accordance with tape motion direction. Thus, for forward motion inverter gate 226 activates a 430 ohm resistor 224 to command a medium torque for the take-up reel while an inverter gate 194 activates a 360 ohm resistor 192 to command a slightly smaller torque for the supply reel. On the supply side of the capstan 56 the tension adjacent the capstan 56 equals the supply tension arm 34 tension plus the head friction tension to balance the somewhat higher tension arm tension on the opposite take up side. On the other hand, for reverse direction motion of tape 16, AND gate 240 is activated to enable 430 ohm resistor 216 and maintain the same tension at the take-up tension arm while inverter gate 186 enables a larger resistor 184 to increase the tension at the supply reel tension arm. However, this higher tension at the supply tension arm 34 is decreased by the friction across head assembly 68 and the tension adjacent the capstan 56 on the supply side remains equal to the tension on the take-up side. Equal tape tensions are thus maintained adjacent capstan 56 on opposite sides thereof for both directions of motion notwithstanding the different friction effects of the head assembly 68 for different directions of motion of tape 16 along the tape path between the tension arms 34, 46. In the event that ¼ inch tape is used, the same principles apply except that all of the tape tensions are reduced somewhat.

Referring now to FIG. 4, the idler roller 54 has a radius $R_t = 1.193$ inches, the guide roller 102 has a radius $R_g = 0.406$ inch, and the distance between the axes 58 and 106 of roller 54 and guide roller 102 respectively is 1.6758 inches. The distance between guide roller axis 106 and supply reel axis 22 is 8.255 inches. Tension arm 34 has a nominal position of approximately 30° with respect to the vertical. For this orientation, the angle $\theta$ between the center line between axes 58 and 106 and the straight line 116 of tape between guide 102 and roller 54 equals 72.58°, the angle $\psi$ between the center line between axes 58 and 106 and the vertical is 6.17°, the angle $\sigma$ between the straight line 116 of tape and horizontal is 11.25° and the angle $\phi$ between the center line between axes 58 and 106 and a perpendicular line from straight tape path line 116 to axis 58 is 17.42°. The moment arm R1 which extends perpendicular to the straight tape path line 116 between guide roller 102 and idler roller 54 can thus be readily calculated to have a length of 1.338 inch and the torque exerted on tension arm 34 about axis 48 by the tape segment along line 116 is equal to 1.338 times the tape tension force at guide roller 102.

The torque exerted about tension arm axis 48 by the segment of tape along line 110 can be determined in accordance with the reel radius $r$. Helical coil 14 is shown at its intermediate radius in FIG. 4 wherein the straight line tape segment along line 110 which is tangential to both tape coil 14 and guide roller 102 is perpendicular to a radial line $Ra$ extending between tension arm axis 48 and guide roller axis 106 and intersects line $Ra$ at the point of tangency with guide roller 102. For this intermediate reel pack diameter, the moment arm R2 is equal to the tension arm radius, $Ra = 1.24$ inch, less the guide roller radius $Rg = 0.406$ inch or 0.834 inch. The total torque exerted about axis 48 is thus $1.338 t + 0.834 t$ where $t$ is the tension in tape 16.

However, as indicated by alternate tape path 260 and alternate moment arm 262 for larger tape pack diameters and alternate tape path 264 and alternate moment arm 266 for smaller tape pack diameters, the moment arm length decreases for tape pack diameters that are either greater than or less than the intermediate tape pack diameter that produces the perpendicular tape path 110-tension arm center line $Ra$ relationship. However, as long as the tape path length 110 between tangential points on guide roller 102 and tape coil 14 remains greater than the total change in the tape pack radius $Rr$, the changes in moment arm length and hence tape tension required for a torque balance will remain acceptable. It has been found that tension per unit torque varies less than ± 7% for tape pack radii varying from 2.25 to 7 inches with the intermediate radius at which the perpendicular tension arm 34 tape path segment 110 relationship exists selected to be about 4.5 inches. Furthermore, since both a large reel pack and a small reel pack will tend to produce a larger tape tension, the tension remains balanced on both sides of the capstan adjacent thereto for all reel pack diameter conditions when a 7 inch coil of tape is used.

The proper positioning and selection of tension arms 34, 46 and their torque transducer solenoids 126, 142 thus cooperate in multiple ways to control and balance tape tension across the drive capstan roller 56. Positioning the arms perpendicular to the intermediate pack tape line greatly reduces changes in tape tension with reel tape pack radius and also provides automatic compensation for changes that do occur because a large tape pack radius produces a change similar in magnitude and polarity as the change caused by a corresponding small tape pack radius in the other reel. Proper shaping of the torque transducer solenoid air gaps permits torque balancing to maintain constant tape tension at the tension arms notwithstanding changes in torque applied by the tape to the tension arms for changes in arm position. Furthermore, the actively powered and controlled torque transducers permit compensation for tension changes at the capstan dependent on operating conditions such as tape motion direction and this compensation can be applied immediately when desired without waiting for changes in tension arm position to produce changes in tape tension.

While there has been shown and described a particular arrangement of a web transport system in accordance with the invention for the purpose of enabling a person of ordinary skill in the art to make and use the invention, it will be appreciated that the invention is not limited thereto. Accordingly, any modifications, variations or equivalent arrangements within the scope of the appended claims should be considered to be within the scope of the invention.

What is claimed is:

1. A web transport system comprising:
    a web storage system disposed to supply and take up web material that is movable bidirectionally along a web path;
    a drive capstan positioned along the web path in non-slip engagement with the web material to control the motion of web material along the web path in accordance with motion of the capstan;
    a capstan energization system coupled to control bidirectional motion of the capstan;
    a pair of web tension arms positioned along the web path on opposite sides of the capstan to maintain buffer loops of web material on opposite sides of the capstan and to maintain web tension on opposite sides of the capstan in accordance with a torque applied to the respective tension arms;
    a pair of torque transducers coupled to apply torque to the pair of tension arms respectively in response to tension command signal with said applied torque opposing the moments of web tension on said arms increasingly as said tension decreases and decreasingly as said tension increases; and
    a torque control system coupled to generate tension command signals which vary in accordance with web transport system operating conditions.

2. The web transport system according to claim 1 above, wherein the capstan has a hard, nonrubber web engaging surface.

3. The web transport system according to claim 2 above, wherein said torque control system is arranged to provide tension command signals of equal strength during a stopped condition of said web, and of unequal strengths during movement of said web with the signal of greater strength being applied to the transducer located downstream from said capstan in the direction of motion of said web, so that said web material is maintained in nonslip engagement with the capstan solely because of web tension and a web wrap angle about the capstan less than 180°.

4. The web transport system according to claim 3 above, wherein the web wrap angle about the capstan is not more than 134° during steady speed motion of the web material along the web path.

5. The web transport system according to claim 1 above, wherein one of the tension arms includes a web engaging roller mounted thereon and is positioned to permit the roller to engage the capstan with web material pinched between the roller and capstan at an extreme rotational position, and wherein the torque control system includes means for generating a first tension command signal commanding a first torque at the one tension arm tending to rotate the one tension arm to pinch web material between the roller and capstan, and means for generating a second tension command signal commanding torque less than the first torque at the one tension arm tending to maintain a loop of web material about the roller, the first and second tension command signals being generated in response to different web transport system operating modes.

6. The web transport system according to claim 1 above, wherein the torque transducers are electromagnetic transducers generating a torque increases with the magnitude of an applied electrical signal.

7. The web transport system according to claim 6 above, wherein the torque control system is responsive to web motion direction along the web path to generate different applied electrical signals for each torque transducer with the torque transducer receiving the greater magnitude of applied electrical signal being selected in accordance with web motion direction along the web path.

8. The web transport system according to claim 7 above, wherein the torque transducers are each constructed to generate a torque that increases as a tension arm rotates to increase web material buffer loop lengths while the applied electrical signal remains constant.

9. The web transport system according to claim 8 above, wherein the capstan has a diameter greater than 1.5 inches (3.31 cm).

10. The web transport system according to claim 9 above, wherein the capstan has a diameter of 2 ⅜ inches (6.03 cm).

11. The web transport system according to claim 9 above, wherein the capstan has a hard, nonrubber tape engaging surface.

12. The web transport system according to claim 11 above, wherein the capstan has an aluminum oxide tape engaging surface.

13. A web transport system comprising:
a web storage system disposed to supply and take up web material that is moveable bidirectionally along a web path;
a drive capstan positioned along the web path in non-slip engagement with the web material to bidirectionally control the motion of web material along the web path in accordance with motion of the capstan;
a capstan energization system coupled to control motion of the capstan bidirectionally;
first and second tension arm means positioned at opposite first and second ends of the web path respectively and on opposite sides of the capstan along the web path for maintaining buffer loops and tension in web material extending along the web path,
said tension arm means being arranged to provide increasing tensioning forces with increasing lengths of said buffer loops, respectively, and decreasing tensioning forces with decreasing lengths of said buffer loops, respectively, so that said web tension has a desired mean magnitude when said loops have corresponding mean lengths, the magnitude of the mean tension being controlled in response to first and second tension command signals respectively; and
a tension control system coupled to provide first and second tension control signals to the first and second maintaining means respectively which command different web tension magnitudes, the tension control signal which commands the larger web tension magnitude being determined in accordance with web motion direction along the web path.

14. The web transport system according to claim 13 above, further comprising a web station positioned along the web path in frictional engagement with the web material between the first maintaining means and the capstan and wherein the second maintaining means is controlled to maintain a larger tension when web motion direction along the web path is from the first toward the second web maintaining means and the first maintaining means is controlled to maintain a larger tension when web motion direction along the web path is from the second toward the first web maintaining means.

15. The web transport system according to claim 14 above, wherein the tension control system commands a differential tension at the first and second maintaining means for each web motion direction such that equal web tensions exist adjacent the capstan on opposite sides thereof.

16. The web transport system according to claim 15 above, wherein the capstan has a hard, nonrubber cylindrical web engaging surface with a diameter greater than 1.5 inch (3.31 cm).

17. The web transport system according to claim 16 above, wherein the web material is magnetic tape and the web station is a transducer head assembly for recording and reproducing information on the magnetic tape.

18. The web transport system according to claim 16 above, wherein the first and second maintaining means each include a tension arm mounted for rotation about an axis and an electromagnetic torque generator coupled to apply a torque to the tension arm about the axis in response to an electrical tension control signal applied thereto.

19. The web transport system according to claim 18 above, wherein the web storage system includes first and second helical coils of web material extending to the first and second tension arms respectively and a web coil energization system responsive to first and second tension arm positions and coupled to rotationally energize the first and second coils to tend to maintain the first and second tension arms at respective nominal rotational positions during steady speed web motion along the web path.

20. The web transport system according to claim 19 above, wherein the first and second coils each have a circumference with a minimum diameter when a minimum amount of web material is stored thereby, a maximum diameter when a typical maximum amount of web material is stored thereby and an intermediate diameter when half the typical maximum amount of web material is stored thereby, wherein web material extends directly from the first and second coils to the first and second tension arms respectively along straight lines with no intermediate web guiding and wherein the nominal positions of the first and second tension arms result in a maximum distance between the respective axes of rotation of the tension arms and respective straight lines of web material thereto, when the first and second coils of web material respectively have an intermediate diameter.

21. An audio magnetic tape transport system comprising:
first and second reels of helically wound magnetic tape physically positioned in side-by-side relationship for rotation about first and second reel axes respectively, the tape extending from the first reel, along a tape path to the second reel; each of the reels having an intermediate tape pack diameter when the reels are half full of tape;
first and second rollers positioned along the tape path with circumferences of equal diameter engaging the tape, the first and second rollers having first and second roller axes of rotation respectively which are physically positioned equidistant from the first and second reel axes respectively, more closely spaced than the reel axes and which lie on a roller line extending parallel to a reel line extending between the reel axes;
first and second tape loop tension arms disposed for rotation about first and second arm axes respectively to maintain buffer storage loops in tape extending along the tape path, the first and second arm axes being physically positioned equidistant from the first and second reel axes respectively and being physically positioned along an arm line that lies between and parallel to the reel line and the roller line, the distance between the first and second arm axes being less than the distance between the first and second roller axes, the first and second tension arms having first and second tape engaging ends respectively which receive tape directly from the first and second reels of tape along first and second straight tape lines respectively without intermediate guiding and which are spaced apart from the first and second arm axes respectively, the first and second tape engaging ends each remaining between the arm line and roller line with a spacing between them greater than the roller axes spacing and less than the reel axes spacing as the tension arms rotate between long and short loop limit positions, the first and second tension arms each having a nominal position between the long and short loop limit positions for steady tape speed along the web path, the first and second straight lines of tape having a greatest distance from the first and second arm axes respectively as measured perpendicular to the straight lines when the respective first and second reels have an intermediate tape pack diameter and the tape engaging end of the second tension arm being in engagement with the second roller with the tape pinched between the tape engaging end of the second arm and second roller at a long loop limit position;
a transducer head assembly positioned in frictional engagement with the tape along the tape path between the first and second rollers, the head assembly engaging a same side of the tape as the first and second rollers;
a first reel energization system responsive to first tension arm position and coupled to rotationally energize the first reel to tend to maintain the first tension arm at its nominal position during steady speed tape motion along the tape path;
a second reel energization system responsive to second tension arm position and coupled to rotationally energize the second reel to tend to maintain the second tension arm at its nominal position during steady speed tape motion along the web path;
a capstan drive system coupled to energize the second roller to control tape motion along the tape path;
first and second torque transducers coupled to apply torque to the first and second tension arms about the first and second arm axes respectively to tend to rotate the tension arms toward longer tape loop positions in response to respective first and second tension control signal magnitudes; and
a tension arm energization system coupled to apply first and second tension control signals to the first and second tension arms respectively in response to tape transport system operating conditions, the second tension control signal having a greater magnitude when tape moves along the tape path in a forward direction from the first roller toward the second roller and the first tension control signal having a greater magnitude when tape moves along the tape path in a reverse direction opposite the forward direction;
the first and second torque transducers being each constructed such that for a given magnitude tension control signal applied thereto, the torque applied thereby about a coupled arm axis tends to increase as a coupled arm rotates toward a longer loop position.

22. The tape transport system according to claim 21 above, wherein the first and second tension arms to oriented relative to the first and second rollers respectively such that the torque per unit tape tension about the respective arm axes applied by a segment of tape extending between the first and second arm and first and second roller respectively increases as the respective arms rotate toward longer tape loop positions.

23. A web transport system comprising:
a helical storage coil of web material having a circumference with an intermediate diameter between a full storage typical diameter and a minimum storage typical diameter when the web coil stores a length of web material equal to one-half the length of web material stored when the coil has a full storage typical diameter, the web coil being disposed to supply and take up web material passing along a straight line between the circumference of the storage coil and a web guide positioned at one end of a web path;

an energization system coupled to rotate the web coil to supply and take up web material moving along the web path;

a web storage system disposed to supply and take up web material at a second end of the web path opposite the one end;

a web drive system coupled to control the motion of web material along the web path;

a web guide positioned to guide web material at the one end of the web path, the web guide being mounted on a rotatable tension arm to maintain a buffer loop of web material;

a tension arm disposed for rotation about a tension arm axis, the tension arm having the web guide mounted thereon at a position spaced apart from the axis and having a nominal position during steady speed motion of web material along the web path such that a line extending from the straight line of web material to the tension arm axis perpendicular to the straight line of web material has a maximum length when the circumference of the storage coil has an intermediate diameter; and torque apparatus coupled to apply a torque to the tension arm about the tension arm axis which torque opposes a torque applied to the tension arm about the tension arm axis as a result of tension in the web material;

said torque apparatus being arranged to apply increasing values of torque to said arm as the web tension decreases, and decreasing values of torque to said arm as said web tension increases.

24. The web transport system according to claim 23 above, wherein a length of web material extending between the storage coil and the guide is greater than the full storage typical radius of the storage coil.

25. The web transport system according to claim 23 above, wherein the energization system includes a sensor coupled to provide an arm position signal indicative of the position of rotation of the arm and rotationally energize the web coil in response to the arm position signal to tend to maintain the arm at the nominal position.

26. The web transport system according to claim 23 above, wherein the web drive system includes a single drive capstan positioned to frictionally engage web material along the web path in nonslip relationship and a capstan energization system coupled to control motion of the capstan.

27. A web transport system according to claim 23 above, wherein the web storage system includes a second helical coil of web storage material having a circumference with an intermediate diameter between a full storage typical diameter and a minimum storage typical diameter when the coil stores a length of web material equal to one-half the length of web material stored when the coil has a full storage typical diameter, the web coil being disposed to supply and take up web material passing along a second straight line between the circumference of the second storage coil and a second web guide positioned at the second end of the web path, and an energization system responsive to a position of rotation of a second tension arm and coupled to rotate the second web coil to supply and take up web material moving along the web path to tend to maintain a second tension arm in a nominal position under a steady speed web motion condition; and further comprising a second web guide positioned to guide web material at the second end of the web path, the second web guide being mounted on a second rotatable tension arm to maintain a buffer loop of web material;

a second tension arm disposed for rotation about a second tension arm axis, the second tension arm having the second web guide mounted theron at a position spaced apart from the second tension arm axis and a nominal position during steady speed motion of the web material along the web path such that a line extending from the second straight line of web material to the second tension arm axis perpendicular to the second straight line of web material has a maximum length when the circumference of the second storage coil has an intermediate diameter; and torque apparatus coupled to apply a torque to the second tension arm about the second tension arm axis which torque opposes a torque applied to the second tension arm about the second tension arm axis as a result of tension in the web material.

28. The web transport system according to claim 27 above, wherein the torque apparatus for applying torque to the first-mentioned and second tension arms each include a variable reluctance rotary transducer having a magnetic field coil and providing a torque that increases as current through the field coil increases, wherein the web drive system includes a single drive capstan in nonslip engagement with the web material and a capstan energization system coupled to control the motion of the drive capstan bidirectionally and further comprising a current control circuit coupled to control the current through the torque apparatus and thereby control the torque applied to the tension arms, the current control circuit being responsive to web motion direction to control torque apparatus currents to maintain equal web tension on opposite sides of the capstan for each direction of web motion.

29. A web transport system comprising:

web material extending from a first helical web storage coil along a tape path to a second helical web storage coil, the web storage coils having outer circumferences with diameters which increase as an amount of web material stored thereby increases from zero to a typical maximum;

means coupled for rotational energization of the first and second web storage coils to cause the first and second web storage coils to supply and take up web material moving along the web path;

a web drive system coupled to control the motion of web material along the web path;

a web guide disposed along the web path with no web path defining element between the web guide and the first web storage coil to provide a straight line of web material extending from the web guide to the outer circumference of the first web storage coil, the web guide being disposed for rotation about a nonconcentric arm axis to maintain a buffer loop of web material, the web guide having a normal position during steady speed web motion such that a line extending from the guide to the arm axis is perpendicular to the straight line of web material when the first web storage coil has a diameter equal to one-half the sum of the zero and typical maximum web storage diameters; and means for applying torque to said arm with said torque increasing with decreasing tape tension and decreasing with increasing tape tension.

30. A web transport system comprising:
a first web storage system coupled to energize a first web storage element storing a helical coil of web material to supply and take up web material at a first end of a web path in accordance with web motion along the web path;
a second web storage system coupled to energize a second web storage element storing a helical coil of web material to supply and take up web material at a second end of a web path opposite the first end in accordance with web motion along the web path;
a first web tension system including a first rigid arm disposed to rotate about a first axis, a first web guide roller mounted on the first arm for rotation about a second axis that is fixed relative to the first arm and that is in parallel spaced-apart relationship to the first axis, and means for applying a torque to tend to rotate the first arm and first guide roller about the first axis to cause the first guide roller to maintain a buffer loop in web material moving along the web path, with said torque increasing with increasing length of said loop and decreasing with decreasing length of said loop, the first arm having a nominal position as web material moves along the web path at a steady speed such that web material extends along a straight line between the first guide roller and a helical coil of web material stored by a first web storage element perpendicular to a line extending between the first and second axes when the first web storage element stores an amount of web material equal to one-half of a typical maximum capacity;
a second web tension system including a second rigid arm disposed to rotate about a third axis, a second web guide roller mounted on the second arm for rotation about a fourth axis that is fixed relative to the second arm and that is in parallel spaced-apart relationship to the first axis, and means for applying a torque to tend to rotate the second arm and second guide roller about the third axis to cause the second guide roller to maintain a buffer loop in web material having along the tape path, with said torque increasing with increasing length of said loop and decreasing with decreasing length of said loop, the second arm having a nominal position as web material moves along the web path at a steady speed such that web material extends along a straight line between the second guide roller and a helical coil of web material stored by a second web storage element perpendicular to a line extending between the third and fourth axes when the second web storage element stores an amount of web material equal to one-half of a typical maximum capacity;
a single drive capstan positioned along the web path to frictionally engage web material and control the motion thereof along the web path; and
a capstan energization system coupled to energize the capstan.

* * * * *